(12) United States Patent
Perttula

(10) Patent No.: US 7,587,684 B2
(45) Date of Patent: Sep. 8, 2009

(54) MOBILE COMMUNICATION TERMINAL AND METHOD THEREFORE

(75) Inventor: Paavo Perttula, Helsinki (FI)

(73) Assignee: Nokia Corporation, Espoo, FL (US)

( * ) Notice: Subject to any disclaimer, the term of this patent is extended or adjusted under 35 U.S.C. 154(b) by 378 days.

(21) Appl. No.: 11/337,935

(22) Filed: Jan. 23, 2006

(65) Prior Publication Data

US 2007/0174785 A1 Jul. 26, 2007

(51) Int. Cl.
*G06F 3/14* (2006.01)

(52) U.S. Cl. .................. 715/838; 715/815; 715/841; 715/864

(58) Field of Classification Search ............ 715/810, 715/864, 815, 838, 841
See application file for complete search history.

(56) References Cited

U.S. PATENT DOCUMENTS

| 5,835,091 | A   |   | 11/1998 | Bailey et al. ............... 345/345 |
| 6,417,874 | B2  | * | 7/2002  | Bodnar .................... 715/854 |
| RE38,401  | E   | * | 1/2004  | Goldberg et al. ............ 345/720 |
| 6,990,534 | B2  | * | 1/2006  | Mikhailov et al. .......... 709/250 |
| 7,181,701 | B2  | * | 2/2007  | Howard et al. ............. 715/854 |
| 7,199,802 | B2  | * | 4/2007  | Gusmorino et al. ......... 345/589 |
| 7,283,845 | B2  | * | 10/2007 | De Bast .................... 455/566 |
| 2003/0144868 | A1 |   | 7/2003  | MacIntyre et al. ............ 705/1 |
| 2004/0237050 | A1 |   | 11/2004 | Anderson ................... 715/764 |
| 2005/0210399 | A1 |   | 9/2005  | Filner et al. ................. 715/767 |
| 2005/0225559 | A1 |   | 10/2005 | Robertson et al. .......... 345/581 |
| 2006/0123360 | A1 | * | 6/2006  | Anwar et al. ............... 715/810 |

FOREIGN PATENT DOCUMENTS

| EP | 0 369 961 A2 | 10/1989 |
| WO | WO 02/089010 A1 | 11/2002 |

* cited by examiner

*Primary Examiner*—Ba Huynh
*Assistant Examiner*—Kim-Lynn Dam
(74) *Attorney, Agent, or Firm*—Perman & Green LLP

(57) ABSTRACT

Method in a mobile communications device comprising a display unit and an input unit, the method comprising: in a first navigation mode displaying, on said display unit, an image comprising at least one application icon, said application icon being selectable and representing an application executable on said mobile communications device, receiving selection data from the input unit, said selection data indicating a selection of a second navigation mode, in a transfer mode, between the first and second navigation modes, reducing the size of said image on said display unit, in the second navigation mode displaying a selected data subset in one ore more graphic frames on said display unit, the selected data subset being a subset out of data, being provided by a selected user application in a displayable format, the user application running under supervision of an operating system of the mobile communications device. Also disclosed is a mobile communications device.

15 Claims, 5 Drawing Sheets

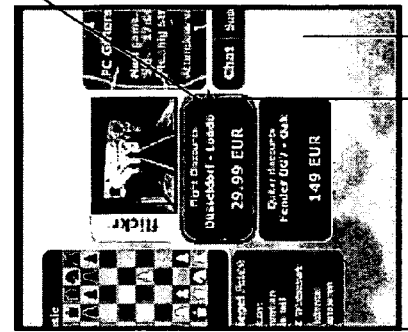 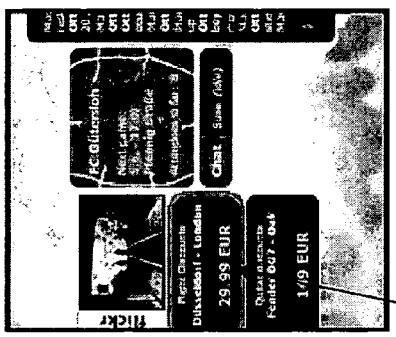 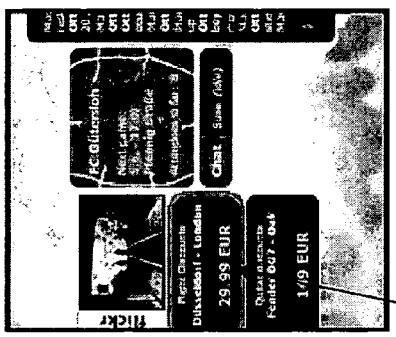 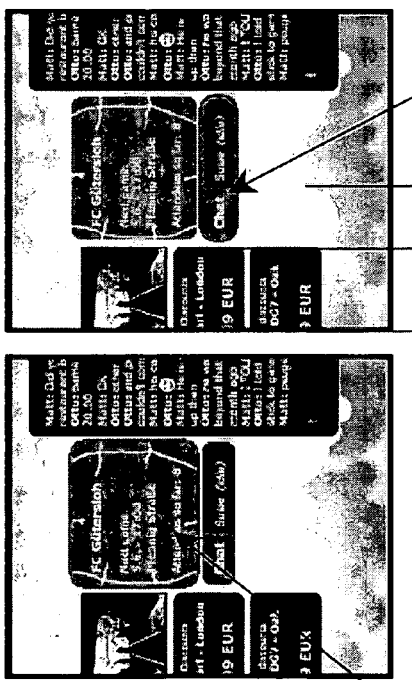
Fig 4a  Fig 4b  Fig 4c  Fig 4d
Fig 5

MOBILE COMMUNICATION TERMINAL AND METHOD THEREFORE

FIELD OF INVENTION

The invention relates to a method in a mobile communications device comprising a display unit and an input unit, the method comprising: in a first navigation mode displaying, on said display unit, an image comprising at least one application icon, said application icon being selectable and representing an application executable on said mobile communications device.

The invention further relates to a mobile communications device comprising a control unit, a display unit and an input unit, wherein in a first navigation mode the display unit is adapted to display an image comprising a plurality of application icons, said application icons being selectable and representing applications executable on said mobile communications device.

TECHNICAL BACKGROUND

A mobile communications device basically comprises an set of buttons and a joystick, a screen, by which the user is given feedback from the mobile communications device, and electronic circuitry providing the communication application by which the mobile communications device is able to communicate with other communications devices via a base station system.

A mobile communications device of this basic kind is well-known in the art and there is no need for any detailed description of this basic features of the mobile communications device.

As soon as the mobile communications device is turned on, the operating system of the mobile communications device starts running. The operating system handles e.g. the interaction between the display unit, the input unit, and the communications unit. The operating system also handles other kinds of applications, such as a contact management application, a calendar application, a settings application for setting the behaviour of the phone and its operating system, a web application, etc.

The operating system is adapted to in a desktop view show the different applications on the display unit in the form of so-called icons. The icons are basically graphic representations of imaginary start buttons. The user navigates, using the joystick or the buttons, between the icons on the desktop. Usually, one of the icons is always highlighted or otherwise indicated. When the user presses the arrow buttons or actuates the joystick, the icon being located adjacent, in the intended direction, the previously highlighted icon will be highlighted.

When the joystick or a physical selection button is pressed down, the application associated with the at the time highlighted icon is activated. The window of the thus activated application is shown on the screen of the mobile communications device. It is also common that each icon in the desktop view are entrances to another set of icons, usually presented as a list in order for the user to distinguish if he/she is on the top desktop level or at a lower level below an icon of the desktop level. When the icon of the list is selected the associated application is activated and as mentioned above the window of the application is shown in the window of the mobile communications device. When the user has done the desired operations within the application, the user exits the application. The user is at this point presented with the desktop or the list of icons depending on from where the applications was activated.

The users of the mobile communications devices want to have relatively small and lightweight devices. This in turn will give significant limitations concerning the available maximum size of the screen of the mobile communications device. Moreover, a larger screen will need more power than a smaller one, which in turn gives that a mobile communications device with a large screen will require a larger battery or will need to be recharged more often.

The user is presented with a plurality of icons on the rather limited size of the desktop. However, the number of icons is limited since each icon must be larger than a smallest acceptable size in order for the user to be able to easily distinguish what application or group of applications the respective icon is associated with.

As the mobile communications devices is provided with more and more applications, this navigation system will experience more short-comings. The applications must be grouped to a larger extent than before which will force the user to make a more complex navigation in order to reach the desired application. Since the mobile communications device need to be small, the navigation tools, such as buttons and joystick, are also subject to size limitations. This size limitation of the navigation tools will, in combination with the complex navigation, introduce a ergonomical risk to the user. When using the joystick, the user will e.g. be moving his/hers thumb a lot and in a complex movement patterns. Moreover, the user will have to have a strong focus on the screen which will strain the users eye.

These problems have become especially aggravated by the introduction of web browsers in the mobile communications devices. It is difficult to navigate through a web content using the above described navigation.

SUMMARY OF THE INVENTION

It is an object of the invention to address the above discussed problems. This has in accordance with the invention been achieved by a method in a mobile communications device and by a mobile communications device.

In accordance with an aspect of the invention it relates to a method in a mobile communications device comprising a display unit and an input unit, the method comprising: in a first navigation mode displaying, on said display unit, an image comprising at least one application icon, said application icon being selectable and representing an application executable on said mobile communications device, receiving selection data from the input unit, said selection data indicating a selection of a second navigation mode, in a transfer mode, between the first and second navigation modes, reducing the size of said image on said display unit, in the second navigation mode displaying a selected data subset in one ore more graphic frames on said display unit, the selected data subset being a subset out of data, being provided by a selected user application in a displayable format, the user application running under supervision of an operating system of the mobile communications device.

The method may further comprise in the transfer mode introducing the graphic frames from an outer perimeter of the display unit.

The method may further comprise in the transfer mode displaying a graphic representation of the mobile communications device, and reducing the size of the graphic representation of the mobile communications device with the reducing of the size of said image.

The method may further comprise in the second navigation mode receiving a selection data from the input unit, said selection data indicating a selection of a first subset of data displayed in a graphic frame on said display unit, enlarging the graphic frame associated with the selected subset of data, and a) selecting a second data subset of the data from which the first data subset is selected, and displaying said second data subset in said enlarged graphic frame, or b) displaying the data provided by the application in said enlarged graphic frame.

In accordance with an aspect of the invention it relates to a mobile communications device comprising a control unit, a display unit and an input unit, wherein in a first navigation mode the display unit is adapted to display an image comprising a plurality of application icons, said application icons being selectable and representing applications executable on said mobile communications device, the control unit is adapted to receive selection data from the input unit, said selection data indicating a selection of a second navigation mode, in a transfer mode, between the first and second navigation modes, the control unit is adapted to reduce the size of said image and display it on said display unit, in the second navigation mode the display unit is adapted to display a selected data subset in one ore more graphic frames, the selected data subset being a subset out of data, being provided by a selected user application in a displayable format, the user application running under supervision of an operating system of the mobile communications device.

In the transfer mode the control unit may be adapted to introduce and on the display unit display the graphic frames from an outer perimeter of the display unit.

In the transfer mode the display unit may be adapted to display a graphic representation of the mobile communications device, and the control unit may adapted to reduce the size of the graphic representation of the mobile communications device and display the reduced graphic representation with the reducing of the size of said image.

In the second navigation mode the control unit may be adapted to receive a selection data from the input unit, said selection data indicating a selection of a first subset of data displayed in a graphic frame on the display unit, the control unit may adapted to enlarge the graphic frame associated with the selected subset of data, and a) selecting a second data subset of the data from which the first data subset is selected, and the display unit may adapted to display said second data subset in said enlarged graphic frame, or b) displaying the data provided by the application in said enlarged graphic frame.

BRIEF DESCRIPTION OF THE DRAWINGS

The invention will by way of example be described in more detail with reference to the appended schematic drawings, which shows a presently preferred embodiment of the invention.

FIGS. 4a-d shows different navigation steps in the second navigation mode.

FIG. 5 shows a navigation step (selection) in the second navigation mode.

DETAILED DESCRIPTION OF PREFERRED EMBODIMENTS

Figure 1:
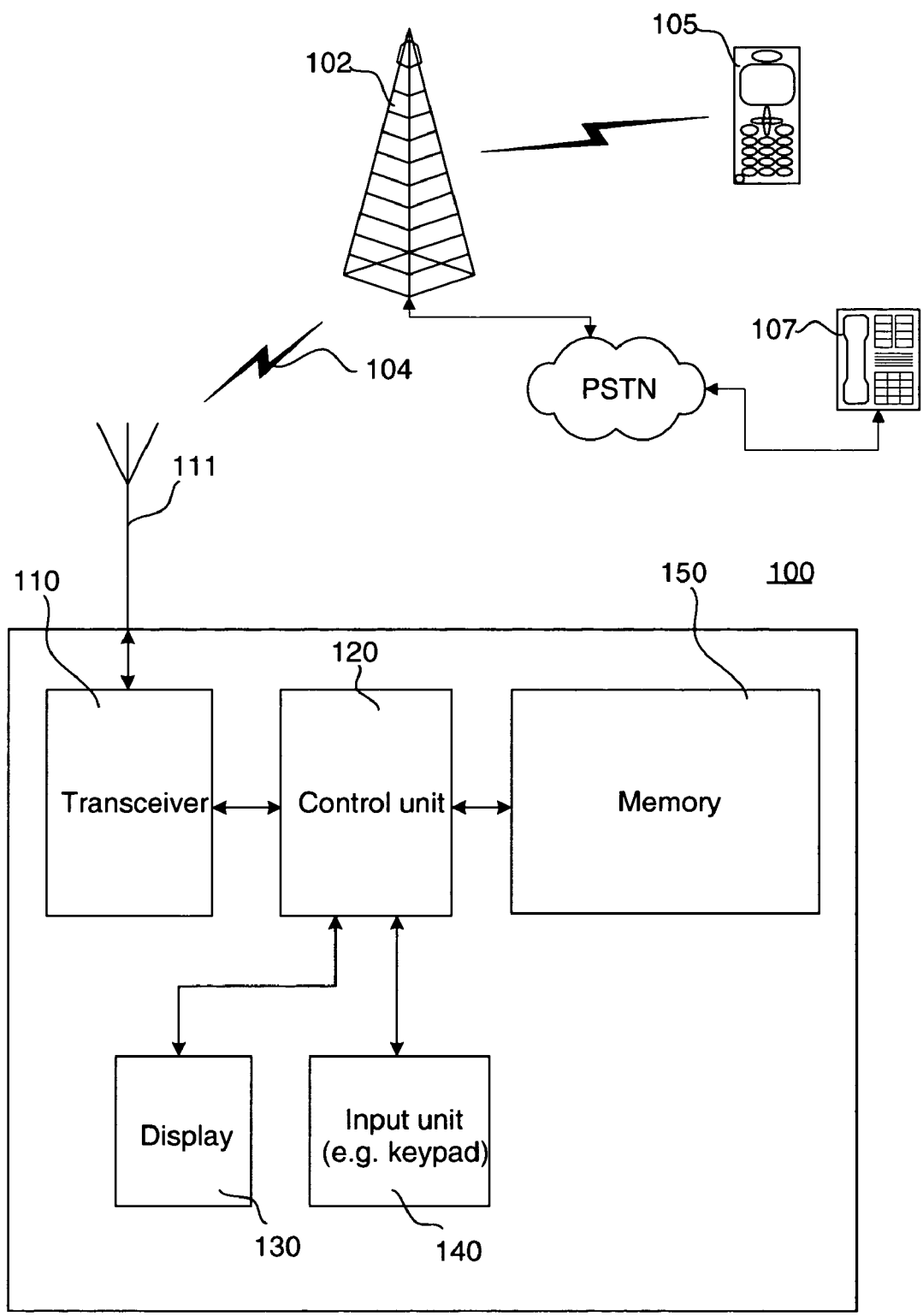
FIG. 1 shows the basic components of a mobile communications device and system.

FIG. 1 is a schematic block diagram of a mobile telecommunication terminal 100 according to a preferred embodiment of the present invention. A transceiver 110 is used for communicating with a base station 102 via an antenna 111. The base station 102 is in communication with other mobile telecommunication terminals 105 via a mobile communications network, and stationary terminals 107 via e.g. a public switched telephone network (PSTN). The transceiver 110 may be arranged to operate in various frequency bands, such as 880-915 MHz and 925-960 MHz (GSM900), 1710-1785 MHz and 1805-1880 MHz (GSM1800), 1850-1910 MHz and 1930-1990 MHz (GSM1900), and 1885-2025 MHz and 2110-2200 MHz (UMTS). It is appreciated that other frequency bands are equally possible depending on the specifications of the network in which the mobile telecommunication terminal 100 is to operate.

A control unit 120 is coupled to the transceiver 110. The control unit 120 may comprise signal processing circuitry in order to process e.g. voice data and message data (e.g. SMS or MMS) from a user of the mobile telecommunication terminal 100 and provide the transceiver 110 with the processed data for transmission to the base station 102. Likewise, the control unit 120 may comprise signal processing circuitry for processing data received from the other telecommunication terminals 105, 107 in order to provide the user of the mobile telecommunication terminal 100 with e.g. audio, image, video or message data. Alternatively (not shown) some or all of the signal processing functionality may be provided by specialized circuitry in the mobile telecommunication terminal 100.

The control unit 120 is coupled to a display 130 for providing a user of the mobile telecommunication terminal 100 with visual data regarding e.g. a specific call in progress, telecommunication numbers stored in the mobile telecommunication terminal 100, signal strength of the wireless communication link 104, messages received from other mobile telecommunication terminals, etc.

The control unit 120 is moreover coupled to an input unit 140, which may be in the form of a keyboard/keypad; an on-screen touch-sensitive keyboard; a navigation wheel or joystick for scrolling and selecting items, digits and/or characters shown on the display 120; etc. The input unit 140 may be integral with the mobile telecommunication terminal 100 or separate from the mobile telecommunication terminal 100, wherein the input unit is connected to the mobile telecommunication terminal when needed. The mobile telecommunication terminal 100 may alternatively be provided with an integral input unit 140 in the form of a small size keyboard, such as a 12-key numeric keypad (digits 0-9, * and #), for normal use as well as a connector for connecting an external input unit e.g. in the form of a QWERTY keyboard for entering larger amounts of text (not shown).

A memory 150 is connected to the control unit 120. The memory 150 may be a single memory or many different memories implemented on different chips, alone or together with other electronic circuitry, by means of different technologies (such as RAM, ROM, EPROM, EEPROM, Flash, etc) which all are accessible by the control unit 120.

A mobile communications device of this basic kind is well-known in the art and there is no need for any further detailed description of this basic features of the mobile communications device.

Figure 3:
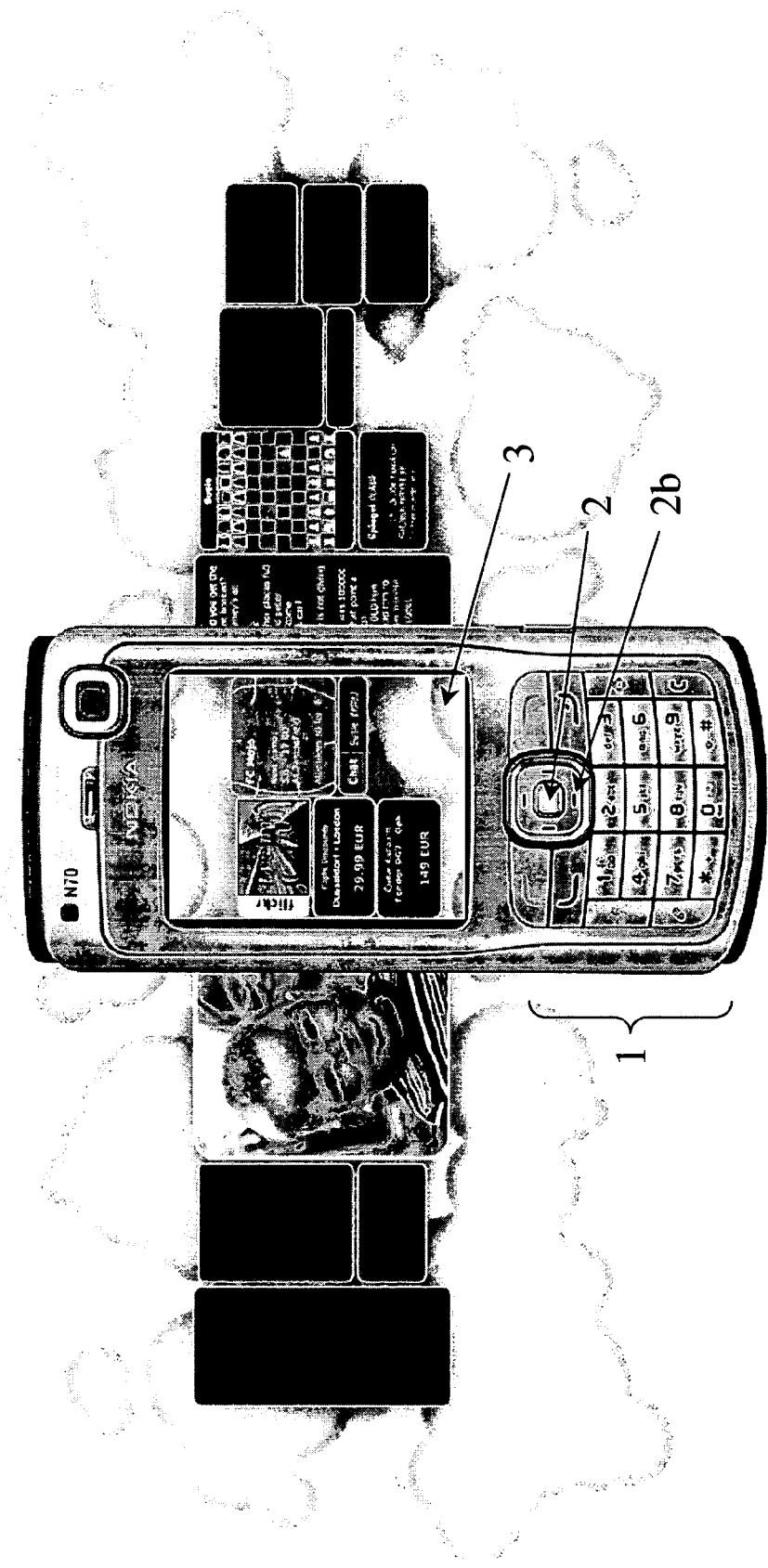
FIG. 3 graphically shows the complete virtual dashboard in the second navigation mode.

FIG. 3 shows a mobile communications device comprising a set of buttons 1 and a joystick 2, a screen 3.

As soon as the mobile communications device is turned on, the operating system of the mobile communications device starts running. The operating system handles e.g. the interaction between the display unit 3, the input unit 1,2, and the communications unit.

The operating system is adapted to also handle other kinds of applications, such as a contact management application, a calendar application, a settings application for setting the behaviour of the phone and its operating system, a web application, etc, when they are activated.

The operating system is adapted to, in a desktop view (see FIG. 2a), display the different available applications on the display unit 3 in the form of so-called icons 4. The icons 4 are basically graphic representations of imaginary start buttons. The user navigates, using the joystick 2 or the buttons 1, between the icons 4 on the desktop. In this desktop view in FIG. 1a, one of the icons 4a is highlighted as indicated by the square line around it. When the user presses the rightward button or actuates the joystick 2 to the right, the icon 4b to the right of the previously highlighted icon 4a will be highlighted.

When the joystick 2 or the physical selection button is pressed down, the application associated with the at the time highlighted icon 4a is activated. The window of the thus activated application is shown on the screen of the mobile communications device. It is also common that each icon in the desktop view are entrances to another set of icons, usually presented as a list in order for the user to be able distinguish if he/she is on the top desktop level or at a lower level below an icon of the desktop level. When the icon of the list is selected the associated application is activated and, as mentioned above, the window of the application is shown on the screen 3 of the mobile communications device. When the user has performed the desired operations within the selected application, the user exits the application. The user is at this point presented with the desktop or the list of icons depending on from where the applications was activated.

The mobile communications device has two different modes of navigating between different applications.

The first navigation mode is the mode described above where the user navigates a between a set of icons 4a, 4b on a desktop on which the icons are displayed. This mode of navigation is known in the art and requires no further explanation.

The second navigation mode involves also an imaginary third dimension orthogonal to the two dimensions of the screen surface. In addition to moving up/down/left/right, this navigation mode supports the impression of a navigation in a third dimension by giving the impression of rising and falling in this third dimension.

The user may enter the second mode of navigation by selecting a specific icon 4a when navigating the desktop in accordance with the first navigation mode. This change of navigation mode may also be accomplished by the user pressing or holding a specific button for a certain time period (e.g. the #-button).

Figure 2:
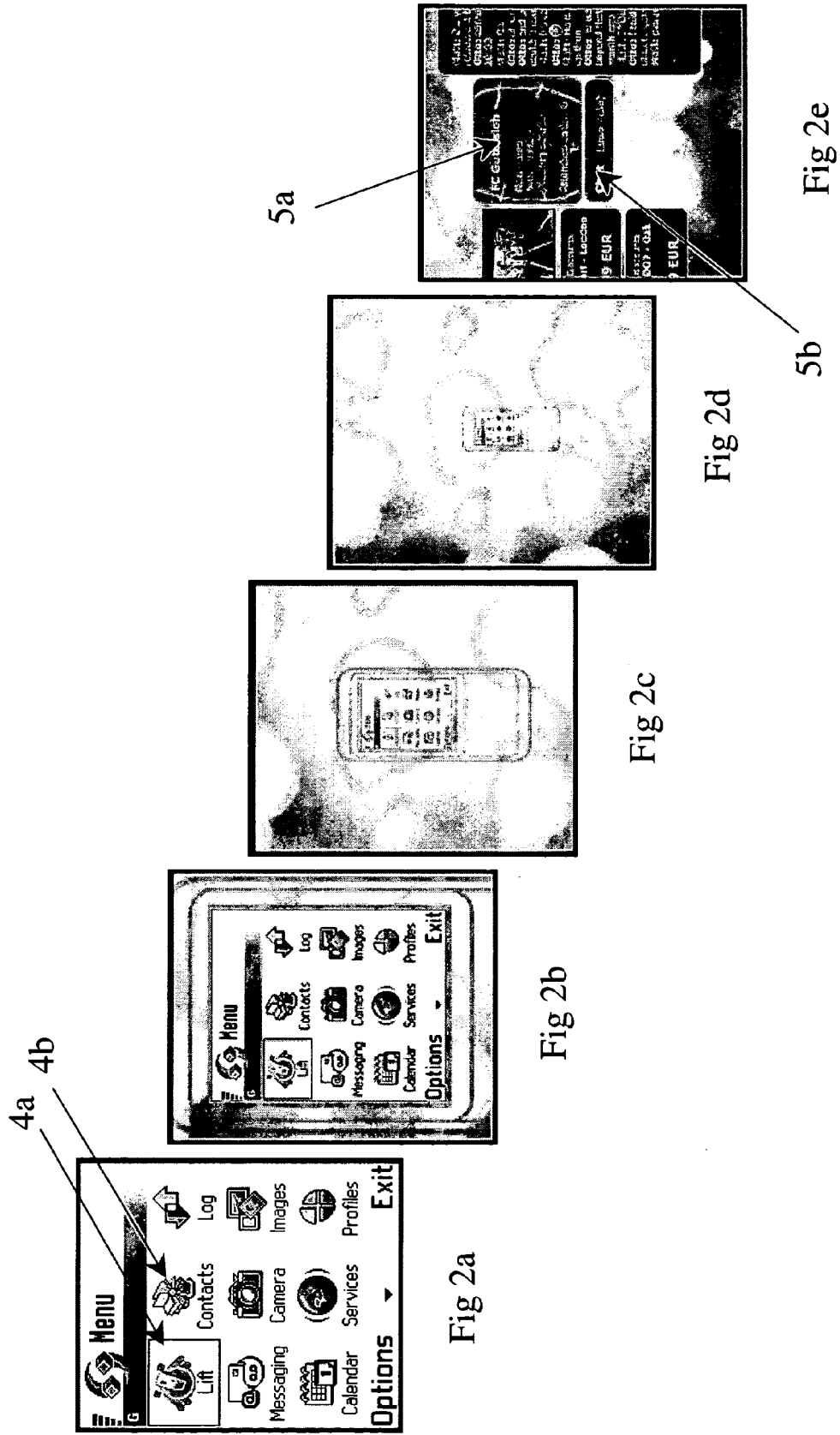
FIGS. 2a-2e shows the image shown in the screen when the mobile communications device is transferred between a first and a second navigation mode.

When the second navigation mode is to be activated, the mobile communications device will in a transfer mode display how the users view is raised relative not only to the desktop, but to the complete mobile communications device as shown in FIG. 2b-2d.

This is accomplished by continuously reducing the size of the image representing the desktop of the mobile communications device in the first navigation mode. As the desktop no longer completely fills the screen 3, the image of the desktop will be completed with a graphic representation of the mobile communications device (see FIG. 2b-2d). The graphic representation of the mobile communications device is reduced with the reducing of the desktop image. This will give an impression that the user will be raised upwardly relative the mobile communications device.

This impression may be further enhanced by displaying clouds introduced from the sides giving the impression that the user floats upwardly through the clouds.

At the end of the transition from the first navigation mode to the second navigation mode, the user will be presented with a virtual dashboard (see FIG. 2e).

The virtual dashboard is formed by or provided with a number of data subsets 5a, 5b displayed in graphic frames representing a first abstraction level of data. A the end of the transfer mode, the virtual dashboard and its data subsets may be introduced from the sides or outer perimeter of the screen 3 giving the impression that the user floats upwardly through it or between the graphical frames until the user stabilises at level above the dashboard. The basic data is provided by actively running applications, such as a web browser or the like, running under the supervision of the operating system of the mobile communications device. The applications comprising the complete amount of data is actively running in the operating system of the mobile communications device but are not displayed to the user. The displayed data subsets 5a, 5b are selected from the displayable information of the applications. The data subsets 5a, 5b are representative parts of the complete data provided by the application at a given instant.

As shown in FIG. 3, the virtual dashboard may comprise a plurality of data subsets not displayed in the screen 3. The user navigates in the plane of the virtual dashboard by using the joystick 2. By using the arrow button(s) 2b, the user may change which information item is highlighted.

In FIG. 4a, the top centre data subset 5a is highlighted. In FIG. 4b, the bottom centre data subset 5b is highlighted. In FIG. 4c and FIG. 4d, the left, middle data subset 5c is highlighted. The data subset 5c contains data extracted from an hidden, active application running in the operating system of the mobile communications device.

It may be noted, in the sequence from FIG. 4b to FIG. 4d, that the foreground picture formed by the data subsets 5a-5c and the background picture of the clouds has moved from their original positions indicated by A and B to their new positions indicated by A' and B'.

The control unit determine a first position B and amount of the picture background data to display on the screen 3 and a first position A and amount of the foreground picture data 5a, 5b to display on the screen 3. The display unit displays the background and foreground picture data according to the determined first positions and amounts. The control unit receives direction data, from an input device in the mobile communications device, the direction data defining a direction of movement of said displayed amount of foreground picture data on said display unit. The control unit determines, based on the received direction data, a second position B' and amount of the background picture data to display and, also based on the received direction data, a second position A' and amount of the foreground picture data to display.

The second position B' associated with the background picture data corresponds to a first displacement in or opposite said direction of movement relative to the first position B, and the second position A' associated with the foreground picture data corresponds to a second displacement in said direction of movement relative to the first position A.

When the foreground and background pictures are moved in the same direction the user will experience that the subsets of data (foreground) is translated essentially in the plane of the screen 3. By moving the foreground and background in different directions it is possible to make the user experience a rolling action, where the data subsets 5a, 5b are located on a sphere being rotated relative to the screen 3 such that other data subsets appear.

By moving the foreground and background in the same direction and setting the movement of the background to be slightly shorter or slower than the movement of the foreground the impression of depth is further enhanced.

When the control unit receives a selection data from the input unit indicating a selection of the highlighted data subset, the graphic frame associated with the selected subset of data is enlarged.

Depending upon which abstraction level the data subset is located the control unit will a) select a second data subset of the data from which the first data subset is selected and displaying this second data subset in the enlarged graphic frame, or b) displaying the data provided by the application in the enlarged graphic frame.

Thus, if it has been considered convenient to provide several abstraction levels, the selection of a data subset may give another more detailed data, but still a selected subset of a more detailed data. If it has been considered convenient to not provide any more abstraction levels beneath the selected data subset, the mobile communications device will display the actual application and the actual information in full detail.

This enlarged graphic frame comprising more detailed information compared to the selected data subset is shown in FIG. 5. This information may be the complete information of the application but it may also be a second subset of the complete information still remaining hidden.

The different abstraction levels and the selection of data subsets will hereinafter be discussed in more detail with reference to FIG. 6.

Figure 6:
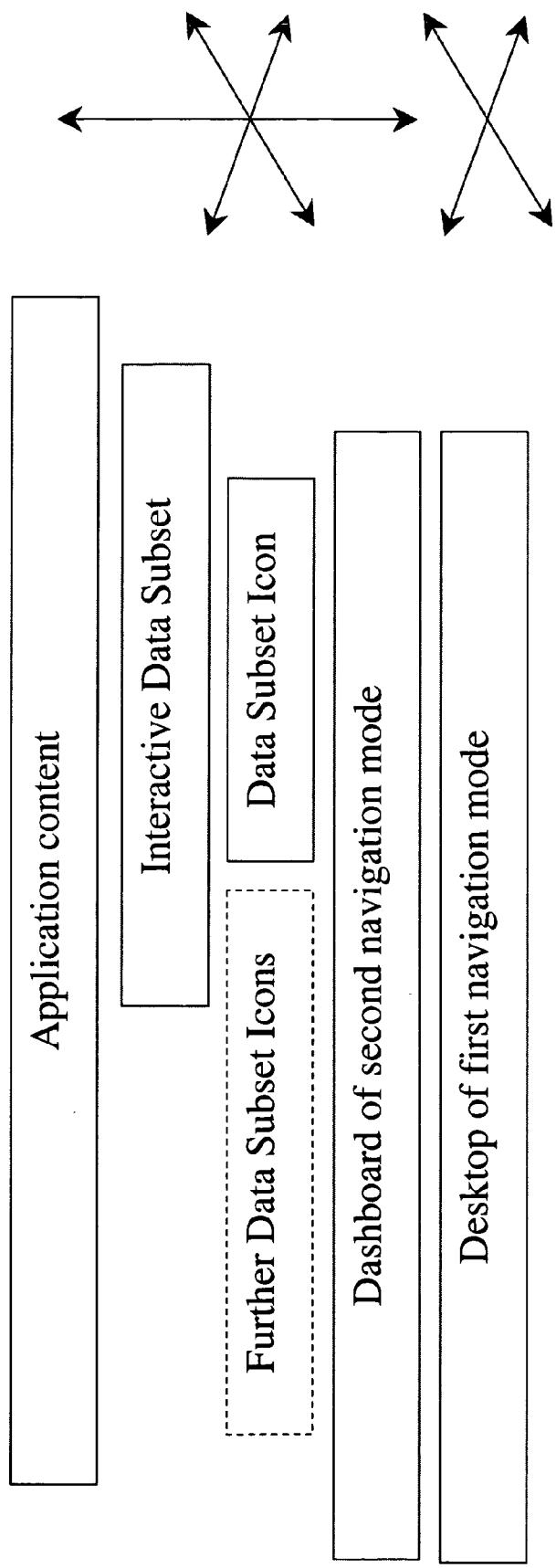
FIG. 6 shows different abstraction levels (data subsets) of the application content.

The user will initially be presented with the ordinary navigation mode using icons on a desktop (as shown in detail in FIG. 2a) indicated at the bottom level of the pile of boxes in FIG. 6. When the user selects to change the navigation mode to the second navigation mode the user will after the transition be presented with the dashboard of the second navigation mode (the second lowest box). This dashboard is shown in detail in FIG. 3. The dashboard is provided with data subset icons 5a, 5b graphically presenting a representative part of the data displayable by the applications running in a hidden mode. When the user selects a data subset icon 5a, 5b, the graphic frame will be enlarged (see FIG. 5) and a interactive data subset will be presented in the enlarged graphic frame. The application will still be running in a hidden mode and the data subset in the enlarged graphical frame will be a representative part of the complete data displayable by the application.

When the user desires to change to the navigation mode referred to as the first navigation mode, the user will experience the reverse movement compared to the changing to the second mode of navigation. Thus, the user will experience the movement from FIG. 2e to FIG. 2a. The user may choose the first or the second navigation mode as the default navigation mode.

It is contemplated that there are numerous modifications of the embodiments described herein, which are still within the scope of the invention as defined by the appended claims.

It may for instance be noted that the display unit and input unit may completely or partly integrated, such in a touch screen.

It is also contemplated that, at the first abstraction level in the second navigation mode, the applications may be partly or completely displayed to the user. In such a case it is preferred that they are shown in such a way that it gives the impression that they are located at a different height along the third dimension.

It should also be noted that the dashboard also may display icons by which associated applications may be activated.

It may also be noted that it is contemplated that the information items from the actively running applications may belong to different abstraction levels in respect of their application although they are displayed on the same level along the third dimension.

The movement in the plane of the virtual dashboard may be done automatically. This is done by using the navigation between the information items as an indication of the desired movement and by always putting the highlighted information item in the centre of the screen. When the user changes information item to highlight, the virtual dashboard moves to put the highlighted information item in the centre of the screen. It is also contemplated that instead the navigation between the information items may be done automatically. This is e.g. done by always highlighting the information item being in the centre of the screen.

The invention claimed is:

1. Method in a mobile communications device comprising a display unit and an input unit, the method comprising:
    in a first navigation mode displaying, on said display unit, an image comprising at least one application icon, said application icon being selectable and representing an application executable on said mobile communications device,
    receiving selection data from the input unit, said selection data indicating a selection of a second navigation mode that is different from the first navigation mode,
    in a transfer mode, during a transition between the first and second navigation modes, reducing the scale of said image on said display unit, replacing the image comprising at least one application icon with a graphical representation of the mobile communications device, and progressively reducing a scale of the graphical representation until it reaches a predetermined size, wherein the reduced scale graphical representation is replaced by a virtual dashboard,
    in a second navigation mode displaying a selected data subset in one or more graphic frames on said display unit,
    the selected data subset being a subset out of data, and being provided by a selected application in a displayable format,
    the user application running under supervision of an operating system of the mobile communications device.

2. Method according to claim 1, further comprising: in the transfer mode introducing the graphic frames from an outer perimeter of the display unit.

3. Method according to claim 1, further comprising:
    in the second navigation mode
    receiving a selection data from the input unit, said selection data indicating a selection of a first subset of data displayed in a graphic frame on said display unit,
    enlarging the graphic frame associated with the selected subset of data, and a) selecting a second data subset of the data from which the first data subset is selected, and displaying said second data subset in said enlarged graphic frame, or b) displaying the data provided by the application in said enlarged graphic frame.

4. Mobile communications device comprising a control unit, a display unit and an input unit,
    wherein in a first navigation mode, the display unit is adapted to display an image comprising a plurality of application icons, said application icons being selectable and representing applications executable on said mobile communications device, the control unit is adapted to receive selection data from the input unit, said selection data indicating a selection of a second navigation mode that is different from the first navigation mode, in a transfer mode, between the first and second navigation modes, the control unit is adapted to reduce the size of said image and display it on said display unit, the image comprising at least one application icon is replaced with a graphical representation of the mobile communications device, and a scale of the graphical representation is progressively reduced until it reaches a predetermined size, wherein the reduced scale graphical representation is replaced by a virtual dashboard, in the second navigation mode the display unit is adapted to display a selected data subset in one ore more graphic frames, the selected data subset being a subset out of data, and being provided by a selected user application in a displayable format, the user application running under supervision of an operating system of the mobile communications device.

5. Mobile communications device according to claim 4, wherein in the transfer mode the control unit is adapted to introduce and on the display unit display the graphic frames from an outer perimeter of the display unit.

6. Mobile communications device according to claim 4, wherein in the second navigation mode the control unit is adapted to receive a selection data from the input unit, said selection data indicating a selection of a first subset of data displayed in a graphic frame on the display unit, the control unit is adapted to enlarge the graphic frame associated with the selected subset of data, and a) selecting a second data subset of the data from which the first data subset is selected, and the display unit is adapted to display said second data subset in said enlarged graphic frame, or b) displaying the data provided by the application in said enlarged graphic frame.

7. The method of claim 1 wherein the virtual dashboard comprises at least one data subset, each data subset displaying a representative part of a complete data set of a corresponding action.

8. The method of claim 7 further comprising that each data set of the virtual dashboard progressively moves into a display area from an edge of the display unit.

9. The method of claim 7 further comprising that the virtual dashboard includes data sets not immediately visible in a display area of the display unit, and those data sets not visible can be presented in the display area by scrolling a presently visible data set out of the display area.

10. The method of claim 7 further comprising that the data sets are navigated by scrolling the data sets across a display area of the display unit to move visible data sets off the display area and move non-visible data sets into the display area.

11. The method of claim 7 further comprising selecting a data set and enlarging a graphical frame associated with the selected data set to present a second data sub set in the enlarged frame, the second data subset more detailed data relating to the corresponding application.

12. The method of claim 7 further comprising, upon selecting a data set, re-positioning the selected data set to a center region of the display area.

13. The method of claim 1, further comprising, in the second navigation mode, providing a background, wherein the data subset are a foreground, the foreground and background moving in relation to one another.

14. The method of claim 13 further comprising that the foreground and background move in the same direction at different speeds.

15. The method of claim 13 further comprising that the foreground and background move in opposite directions.

* * * * *